United States Patent [19]

Cucchi

[11] Patent Number: 5,170,685
[45] Date of Patent: Dec. 15, 1992

[54] GUIDE FOR BAR LOADERS IN LATHES

[75] Inventor: Pietro Cucchi, Bussero, Italy

[73] Assignee: Pietro Cucchi & Co. s.r.l., Italy

[21] Appl. No.: 821,971

[22] Filed: Jan. 16, 1992

[30]  Foreign Application Priority Data

Jan. 31, 1991 [IT]  Italy .......................... MI91 U 000074

[51] Int. Cl.⁵ .............................................. B23B 13/12
[52] U.S. Cl. .......................................... 82/127; 414/14
[58] Field of Search ................ 82/124, 126, 127, 129, 82/130; 414/14

[56]  References Cited
U.S. PATENT DOCUMENTS 4,292,864 10/1981 Cucchi et al. ................... 82/126 X
4,604,924 8/1986 Cucchi et al. ........................ 82/126
4,953,429 9/1990 Arisaka et al. ................... 82/124 X

*Primary Examiner*—Z. R. Bilinsky
*Attorney, Agent, or Firm*—Shlesinger, Fitzsimmons & Shlesinger

[57] ABSTRACT

A guide (10) for automatic bar feeders for lathes, comprises a plurality of elements (11) with a C-shaped guiding portion (16), disposed aligned and facing each other to form a channel through which the bar (15) slides. Each C-shaped portion (16) is supported by an arm (17) connected to it in an assymetrical position to define portions (19 and 20) of different lengths so as to uniform the flexibility of the elements (11) due to the arm variations with respect to their point of connection (12) to the rest of the feeding device (13, 14).

4 Claims, 1 Drawing Sheet

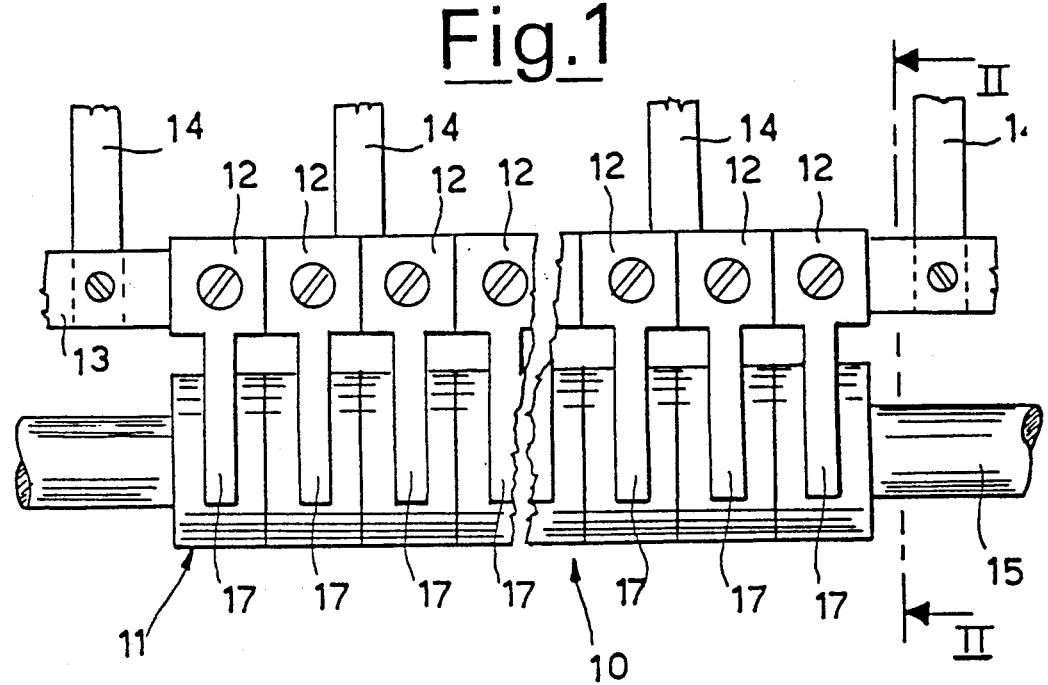
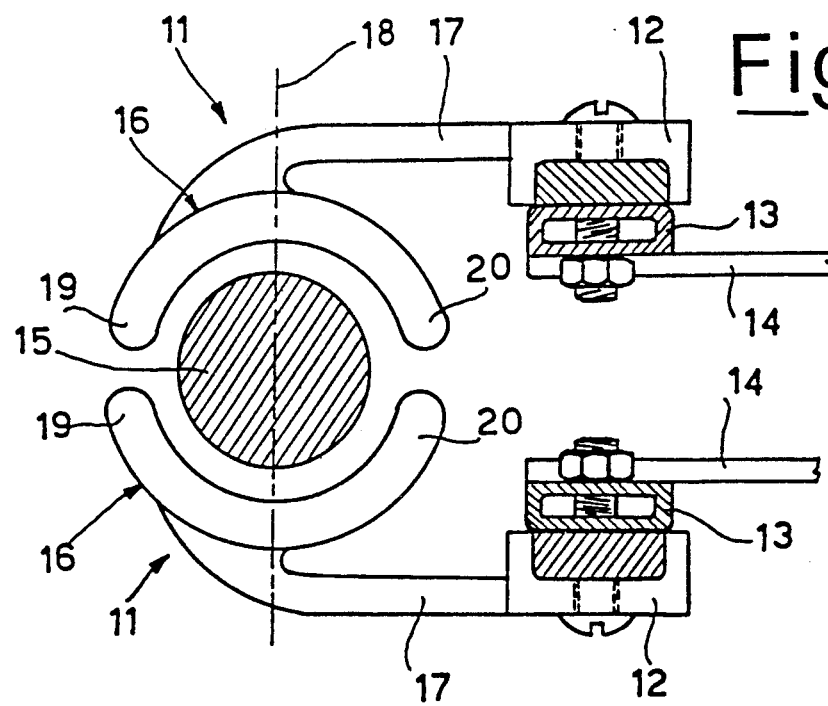

GUIDE FOR BAR LOADERS IN LATHES

Any technician expert in the field is well-acquainted with automatic loaders for feeding bars to lathes, which comprise guides composed of a plurality of elements aligned to form a duct circumferentially embracing a bar to be fed into the lathe, to enable it to rotate freely as it moves forward. The aligned elements are usually C-shaped and disposed facing each other in pairs so as to obtain a gripping movement around the bar to enable it to be inserted radially.

This type of guide is described for example in the Italian patent application No. 21706 B/89; moreover, elements shaped in the form of a C are also described in the Italian patent No. 206 438, both of which are on behalf of the same Applicant.

One of the greatest problems of the aforementioned guides consists of the vibrations which are generated due to the high speed of rotation of the bars and which, as is clearly understandable, give rise to deterioration of the machining precision of the lathe.

In the known technique, various expedients have been put forward in an attempt to absorb the vibrations, so as to at least prevent them from affecting the portion of the bar subjected to machining. These expedients mainly consist of the use of elastic suspensions for damping the vibrations of the guide elements, the latter being made on the contrary with a relatively high degree of rigidity. Despite the fact that at times they are somewhat complicated, these expedients have not yet proved to fully achieve their intended purpose, since they do not ensure a substantially vibration-free rotation, especially in the case of bars with a non-circular cross-section.

The generale scope of this invention is to obviate the aforementioned problems by providing a guide for automatic bar feeders in lathes, which ensures the substantially uniform and vibration-free rotation of the bars. This scope is achieved according to the invention by providing a guide for automatic bar feeders for lathes, of the type comprising a plurality of elements each comprising, substantially within its own plane of extension, a supporting arm connected to the rest of the feeding device to hold it in a position aligned in opposing pairs with the other elements of the plurality so as to form part of a channel for supporting a bar by means of its portion which partially embraces the circumference of the bar, characterized by the fact that the supporting arm is connected to the partial embracing portion at a point halfway along its length to define thereon two free-ended segments, the free-ended segment facing substantially in the direction of the length of the supporting arm being greater in length than the other segment.

The innovatory principles of this invention and its advantages with respect to the known technique will be more clearly evident from the following description of a possible exemplificative and non-restrictive embodiment applying such principles, with reference to the accompanying drawings, in which:

FIG. 1 shows a partial plan view of a guide according to the invention for automatic bar feeders;

FIG. 2 shows a cross-sectional view along the line II—II of FIG. 1.

With reference to the figures, a guide, generically indicated by reference 10, for use in an automatic feeding device for feeding bars to lathes, comprises a plurality of elements 11 having a shank 12 which is secured to a support 13 with brackets 14 connecting it to the rest of the feeding device, which is not shown since it is of known technique and consequently easily imagined by any technician expert in the field. The elements 11, for example, moulded in one piece, are disposed aligned and, as can be seen in FIG. 2, facing each other in pairs so as to define a duct for guiding a bar 15. The upper row of elements can advantageously be made, according to the known technique, to shift apart from the lower row, so as to enable the bar to be inserted radially. What is described up to here is substantially known technique.

FIG. 2 shows a side view of the elements 11 whereby it is possible to observe their particular embodiment based on the innovatory principles claimed herein. Each element 11 comprises a portion shaped in the form of a C or half-bearing 16 in having in one side thereof (its inner side) an arcuate bearing surface disposed to embrace half the circumference of a bar fed into the guide. The shank 12 of each half-bearing is connected by means of an arm 17 to the outer surface of the half-bearing in a position highly asymmetrical with respect to the midpoint 18 of the half-bearing so as to ideally divide the half-bearing into two free-ended portions 19, 20, respectively, of different lengths with respect to the point of attachment of the arm 17, the portion 20, closer to the shank 12 being much longer than the portion further away 19.

In particular, it constitutes an element with differentiated flexibility in which, then the arm is longer and, therefore, more compliant with respect to the support 12, the compliance of the half-bearing decreases in proportion, so that the elastic reactions generated by the half-bearings due to the impact of the bar rotating between them are substantially uniform.

As can be clearly seen in FIG. 2, the arm 17 can constitute a partial rib to appropriately stiffen the portion of the C-shaped element relative to the end 19. It should be noted that an embodiment of this kind uses criteria completely opposite to the usual criteria indicated in the known technique, where the half-bearings of the guides are connected to the supports by means of arms with a connections which extends substantially symetrical over the entire outer surface of the half-bearing, so as to make the structure as rigid as possible. In the known technique, the vibrations generated in the bar by its rotation at high speed are then dampened by means of an elastic support connecting the entire guide to the rest of the machine.

In the embodiment according to this invention it was however surprisingly found that an asymmetrical disposition as described substantially reduces the amount of vibration generated in the bar as it rotates at high speed. This renders the dampening means interposed at the points of connection of the guides to the machine less important and at the same time more efficient. These means can thus be even simpler, more compact and less expensive than the ones normally used in the known technique.

The high degree of efficiency of the innovatory solution described and claimed herein lies precisely in the fact that when the bar impinges upon the guide it receives equal elastic reactions in all directions and this tends to keep the bar centered while at the same time preventing the occurrence of extensive vibrations.

At this point it will be clear that the intended scopes are achieved.

The foregoing description of an embodiment applying the innovatory principles of this invention is obviously given by way of example in order to illustrate such principles and should not therefore be understood as a limitation to the sphere of the invention claimed herein.

For example, the part connecting the guiding elements to the supports of the machine can be different from the one shown by way of example. In particular, it can be of any known type, even with conventional antivibration mountings.

Moreover, even though the guiding elements are represented and described as being specularly identical for the two halves of the guide, they may be made and supported differently in order to fulfill particular requirements in feeding the bars.

I claim:

1. A guide (10) for an automatic bar feeding device for lathes, comprising a plurality of pairs of channel forming elements (11), each of said elements of a respective pair thereof comprising, substantially within its own plane of extension, a half bearing (16) having an arcuate bearing surface in one side thereof, and connected at its opposite side to one end of a supporting arm (17) the opposite end of which is connected to a bar feeding device to hold said half bearing in a position in which its arcuate bearing surface is disposed in coaxial registry with the arcuate surface in the half bearing of the other element of said pair, thereby to form part of a channel for supporting a bar (15), and characterized by the fact that each of said supporting arms (17) is connected to its associated bearing at a point intermediate the length of said bearing to define thereon two free-ended segments (19, 20), the free-ended segment (20) of each bearing facing substantially in the direction of the length of the associated supporting arm (17) and being greater in length than the other segment (19) thereof.

2. Guide as claimed in claim 1, characterized by the fact that each said half bearings (16) is generally C-shaped in configuration.

3. Guide as claimed in claim 2, characterized by the fact that each of said supporting arms (17) extends in a direction substantially perpendicular to the radial axis of symmetry of its associated C-shaped bearing (16).

4. Guide as claimed in claim 1, characterized by the fact that said one end of each of said supporting arms (17) extends as a stiffening rib in the direction of said other free-ended segment (19) of its associated half bearing.

* * * * *